United States Patent
Komeda et al.

(10) Patent No.: US 10,354,803 B2
(45) Date of Patent: Jul. 16, 2019

(54) DEVICES COMPRISING A CAPACITOR AND SUPPORT MATERIAL THAT LATERALLY SUPPORTS THE CAPACITOR

(71) Applicant: Micron Technology, Inc., Boise, ID (US)

(72) Inventors: Kenji Komeda, Hiroshima (JP); Kana Suzuki, Hiroshima (JP)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/248,140

(22) Filed: Jan. 15, 2019

(65) Prior Publication Data

US 2019/0148078 A1     May 16, 2019

Related U.S. Application Data

(63) Continuation of application No. 15/296,229, filed on Oct. 18, 2016, now Pat. No. 10,217,569.

(51) Int. Cl.
| | |
|---|---|
| *H01G 4/08* | (2006.01) |
| *H01G 4/38* | (2006.01) |
| *H01G 4/012* | (2006.01) |
| *H01G 4/224* | (2006.01) |

(52) U.S. Cl.
CPC ............. *H01G 4/385* (2013.01); *H01G 4/012* (2013.01); *H01G 4/224* (2013.01); *H01G 4/08* (2013.01)

(58) Field of Classification Search
CPC .......... H01G 4/385; H01G 4/08; H01G 4/012; H05K 1/181; H05K 1/115; H05K 2201/10015; H01L 27/10852; H01L 28/90; H01L 28/91; H01L 28/87; H01L 28/88; H01L 28/60; G11C 11/221
See application file for complete search history.

(56) References Cited

U.S. PATENT DOCUMENTS

| | | |
|---|---|---|
| 6,319,770 B1 | 11/2001 | Lou |
| 2007/0111432 A1 | 5/2007 | Oh et al. |
| 2013/0323902 A1 | 12/2013 | Lee |
| 2014/0065784 A1 | 3/2014 | Yoon et al. |

*Primary Examiner* — Bilkis Jahan
*Assistant Examiner* — Victor V Barzykin
(74) *Attorney, Agent, or Firm* — Wells St. John P.S.

(57) ABSTRACT

A device includes a capacitor that has first and second electrodes having a capacitor insulator there-between. The first electrode is elongated and extends elevationally. The first electrode has elevationally-extending first conductive material and has second conductive material that projects laterally outward from an elevationally-extending part of the first conductive material. The laterally-projecting second conductive material has a vertical thickness that is less than that of the elevationally-extending first conductive material. Support material laterally supports the capacitor and contacts a tip end of the laterally-projecting second conductive material.

19 Claims, 11 Drawing Sheets

DEVICES COMPRISING A CAPACITOR AND SUPPORT MATERIAL THAT LATERALLY SUPPORTS THE CAPACITOR

RELATED PATENT DATA

This patent resulted from a continuation application of U.S. patent application Ser. No. 15/296,229, filed Oct. 18, 2016, entitled "Devices Comprising A Capacitor And Support Material That Laterally Supports The Capacitor", naming Kenji Komeda and Kana Suzuki as inventors, the disclosure of which is incorporated by reference.

TECHNICAL FIELD

Embodiments disclosed herein pertain to devices comprising a capacitor and support material that laterally supports the capacitor.

BACKGROUND

Memory is one type of integrated circuitry, and is used in computer systems for storing data. Memory may be fabricated in one or more arrays of individual memory cells. Memory cells may be written to, or read from, using digit lines (which may also be referred to as bit lines, data lines, sense lines, or data/sense lines) and access lines (which may also be referred to as word lines). The digit lines may conductively interconnect memory cells along columns of the array, and the access lines may conductively interconnect memory cells along rows of the array. Each memory cell may be uniquely addressed through the combination of a digit line and an access line.

Memory cells may be volatile or non-volatile. Non-volatile memory cells can store data for extended periods of time including when the computer is turned off. Volatile memory dissipates and therefore requires being refreshed/rewritten, in many instances multiple times per second. Regardless, memory cells are configured to retain or store memory in at least two different selectable states. In a binary system, the states are considered as either a "0" or a "1". In other systems, at least some individual memory cells may be configured to store more than two levels or states of information.

A capacitor is one type of electronic component that may be used in a memory cell. A capacitor has two electrical conductors separated by electrically insulating material. Energy as an electric field may be electrostatically stored within such material. Depending on composition of the insulating material, that stored field be volatile or non-volatile. For example, a capacitor insulator including only $SiO_2$ will be volatile. One type of non-volatile capacitor is a ferroelectric capacitor which has ferroelectric material as at least part of the insulating material. A memory cell incorporating a ferroelectric capacitor ideally is non-volatile due to bi-stable characteristics of the ferroelectric material that forms a part of the capacitor. Other programmable materials may be used as capacitor insulator materials to render capacitors non-volatile. Further and regardless, arrays of capacitors may be formed as part of an array of memory cells or an array in other integrated circuitry.

One manner of fabricating capacitors is to initially form an insulative or other support material within which one of the capacitor electrodes is formed. For example, an array of capacitor electrode openings for individual capacitors may be fabricated in an insulative support material, with an example material being silicon dioxide doped with one or both of phosphorus and boron. Openings within which some or all of the capacitors are formed are etched into the support material. Conductive material is deposited to line and less-than-fill the individual openings. The conductive material may be planarized or etched back relative to the support material to form individual elevationally inner capacitor electrodes within individual of the openings. In some methods, most if not all of the support material is then etched away to enable the radially outer sidewall surfaces as well as the radially inner sidewall surfaces of the electrodes to provide capacitor surface area and thereby increased capacitance for the capacitors being formed. Yet, capacitor electrodes formed in deep openings are often correspondingly much taller than they are wide. This can lead to toppling of the capacitor electrodes during etching to expose the outer sidewall surfaces, during transport of the substrate, during deposition of the capacitor insulator material, and/or during deposition of the outer capacitor electrode material. Brace or lattice-like retaining structures have been proposed and used to alleviate such toppling.

DETAILED DESCRIPTION OF EXAMPLE EMBODIMENTS

Embodiments of the invention encompass devices that comprise a capacitor (i.e., at least one capacitor) and support material that laterally supports the capacitor (i.e., at least supports the capacitor from any component thereof moving or tipping laterally). Initial example embodiments are described with reference to FIGS. 1, 1A-1C, and 2. Such depict a portion of a substrate fragment or construction 10 comprising a base substrate 12 having an array of individual capacitors 14 there-over. Base substrate 12 may include any one or more of conductive/conductor/conducting (i.e., electrically herein), semiconductive, or insulative/insulator/insulating (i.e., electrically herein) materials. Various materials are shown above base substrate 12. Materials may be aside, elevationally inward, or elevationally outward of the depicted FIGS. 1, 1A-1C, and 2 materials. For example, other partially or wholly fabricated components of integrated circuitry may be provided somewhere above, about, or within substrate 12. Control and/or other peripheral circuitry for operating components within an array such as a memory array may also be fabricated, and may or may not be wholly or partially within an array or sub-array. Further, multiple sub-arrays may also be fabricated and operated independently, in tandem, or otherwise relative one another. As used in this document, a "sub-array" may also be considered as an array. Regardless, any of the materials, regions, and structures described herein may be homogenous or non-homogenous, and regardless may be continuous or discontinuous over any material which such overlie. Further, unless otherwise stated, each material may be formed using any suitable or yet-to-be-developed technique, with atomic layer deposition, chemical vapor deposition, physical vapor deposition, epitaxial growth, diffusion doping, and ion implanting being examples.

Figure 1:
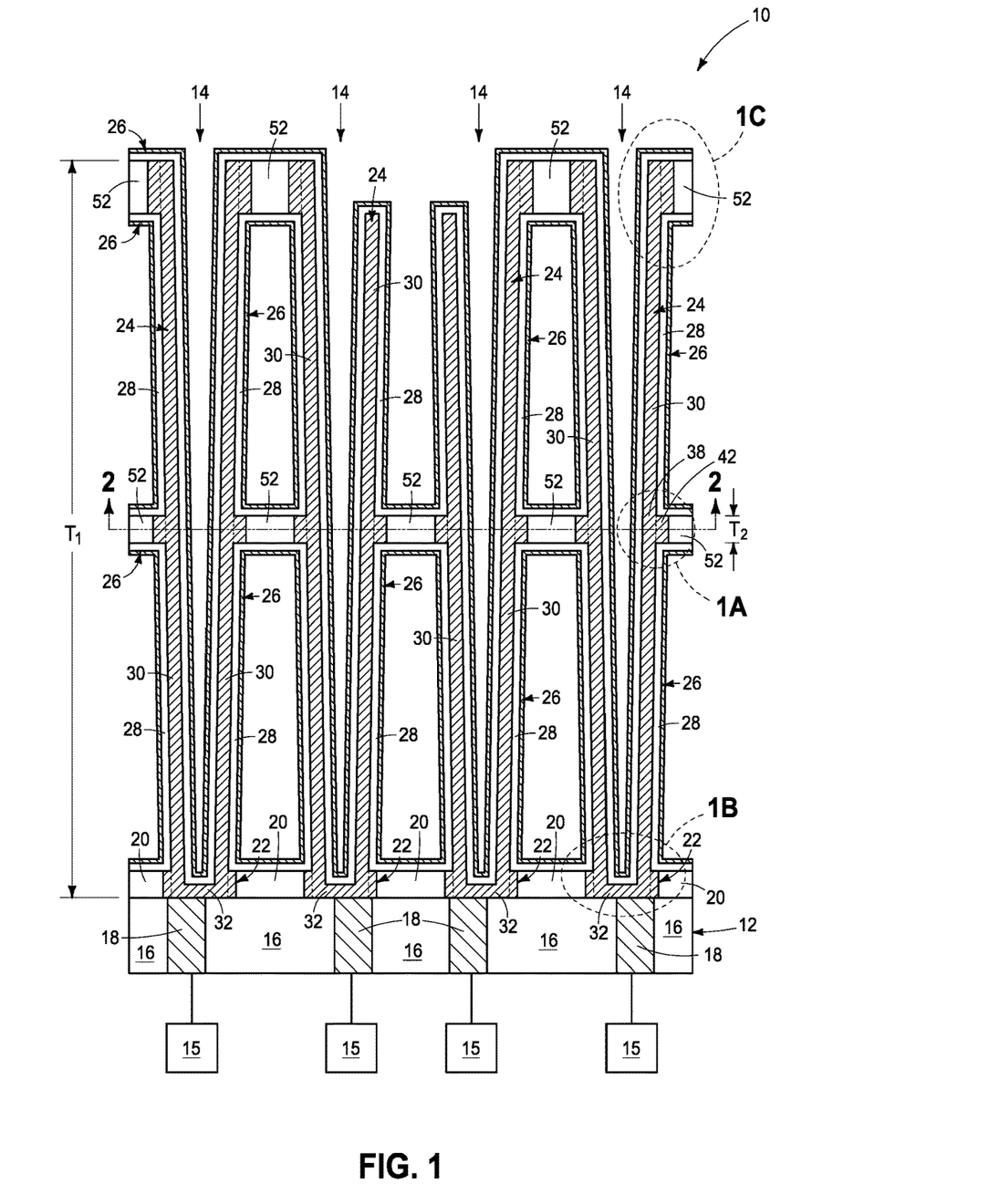
FIG. 1 is a hybrid schematic and diagrammatic cross-sectional view of a device comprising a capacitor in accordance with an embodiment of the invention, and is taken through line 1-1 in FIG. 2.

The discussion largely proceeds with reference to a single capacitor 14, although it will be apparent that aspects of the invention and disclosure may apply equally with respect to an array of capacitors, such as shown. Access devices 15 are schematically shown in FIG. 1, and may be formed as part of base substrate 12. By way of example only, such may comprise field effect transistors for controlling access to individual capacitors 14, for example in DRAM circuitry where an access device 15 and a capacitor 14 comprise components of a single memory cell (e.g., a one transistor, one capacitor [1T/1C] memory cell). However, other memory and non-memory circuitry are contemplated and whether existing or yet-to-be-developed.

Example base substrate 12 is shown as comprising dielectric material 16 (e.g., doped and/or undoped silicon dioxide) having conductive vias 18 extending there-through for electrically coupling an individual access device 15 to an individual capacitor 14. Example conductive materials for vias 18 are one or more of elemental metal, a mixture or alloy of two or more elemental metals, conductive metal compounds, and conductively doped semiconductive materials, with TiN and W being examples. A dielectric material 20 (e.g., silicon nitride and/or silicon oxynitride) is shown atop base substrate 12, and includes openings 22 there-through that overlap with an individual conductive via 18. Material 20 may have functioned as an etch-stop during fabrication. Additionally and/or alternately, dielectric material 20 may function as support material that provides lateral support for a capacitor as will be apparent below.

Individual capacitors 14 comprise a first electrode 24, a second electrode 26, and capacitor insulator material 28 there-between. First and second electrodes 24, 26, respectively, are conductive and may be of the same composition or of different compositions relative one another, and may be of the same composition or of different composition as that of conductive vias 18. One specific example is TiN. Example capacitor insulator materials include one or more of silicon dioxide, silicon nitride, and an insulative metal oxide that comprises one or more elements among zirconium, hafnium, aluminum, niobium, yttrium, and tantalum. Such materials will typically result in capacitors 14 being volatile whereby the capacitors will lose a charge state over time as well as upon removal of voltage application to one or both of capacitor electrodes 24 and 26. Alternately, capacitor insulator material 28 may comprise programmable material such that the individual capacitors are non-volatile and programmable into at least two different magnitude capacitive states (e.g., whereby the programmable material is both sufficiently thick and remains insulative in the different states such that current does not flow there-through at operating voltages). One example such programmable material is ferroelectric materials.

Individual first electrodes 24 are elongated and extend elevationally. In this document, unless otherwise indicated, "elevational(ly)", "higher", "upper", "lower", "top", "atop", "bottom", "above", "below", "under", "beneath", "up", and "down" are generally with reference to the vertical direction. Further, "vertical" and "horizontal" as used herein are directions that are perpendicular or within 10 degrees of perpendicular relative one another independent of orientation of the substrate in three-dimensional space. "Horizontal" refers to a general direction along a primary surface relative to which the substrate was processed during fabrication. Also, "extend(ing) elevationally" and "elevationally-extending" in this document encompasses a range from vertical to no more than 45° from vertical. First electrode 24 in one embodiment comprises sidewalls 30 extending to/from a base 32, and in one embodiment as shown forms an upwardly-facing cup or container shape. Sidewalls 30 may extend vertically (not shown) or taper from vertical (e.g., as shown). Sidewalls 30 may extend linearly straight (e.g., as shown), be curved, include a combination of curved and straight segments, etc. In other embodiments and by way of example only, the individual first electrodes may be elevationally-extending solid pillars/pedestals (not shown) that are completely solid there-across in horizontal cross-section (e.g., not having a hollow, upwardly open, center in a cup/container shape).

In the example depicted embodiment, first electrode 24 is of a double-sided configuration wherein capacitor insulator 28 and second electrode 26 are both radially within and radially outside of sidewalls 30. Second electrode 26 is shown as being a lining that less-than-fills the container/cup opening shape radially inward of sidewalls 30. Alternately, such may completely fill (not shown) the depicted internal cup-shape and/or the depicted void space that is laterally/radially outward of sidewalls 30. An example minimum lateral/radial thickness of the majority of first electrode sidewalls 30 is 30 to 75 Angstroms, while that for capacitor insulator 28 is 30 to 100 Angstroms. In other embodiments and by way of example only, the first electrodes may be of a single-sided configuration (not shown) wherein the capacitor insulator only externally surrounds radially about each of sidewalls 30 of individual first electrodes.

In this document, "thickness" by itself (no preceding directional adjective) is defined as the mean straight-line distance through a given material or region perpendicularly from a closest surface of an immediately adjacent material of different composition or of an immediately adjacent region. Additionally, the various materials or regions described herein may be of substantially constant thickness or of variable thicknesses. If of variable thickness, thickness refers to average thickness unless otherwise indicated, and such material or region will have some minimum thickness and some maximum thickness due to the thickness being variable. As used herein, "different composition" only requires those portions of two stated materials or regions that may be directly against one another to be chemically and/or physically different, for example if such materials or regions are not homogenous. If the two stated materials or regions are not directly against one another, "different composition" only requires that those portions of the two stated materials or regions that are closest to one another be chemically and/or physically different if such materials or regions are not homogenous. In this document, a material, region, or structure is "directly against" another when there is at least some physical touching contact of the stated materials, regions, or structures relative one another. In contrast, "over", "on", "adjacent", "along", and "against" not preceded by "directly" encompass "directly against" as well as construction where intervening material(s), region (s), or structure(s) result(s) in no physical touching contact of the stated materials, regions, or structures relative one another.

Figures 1A, 1B, 1C:
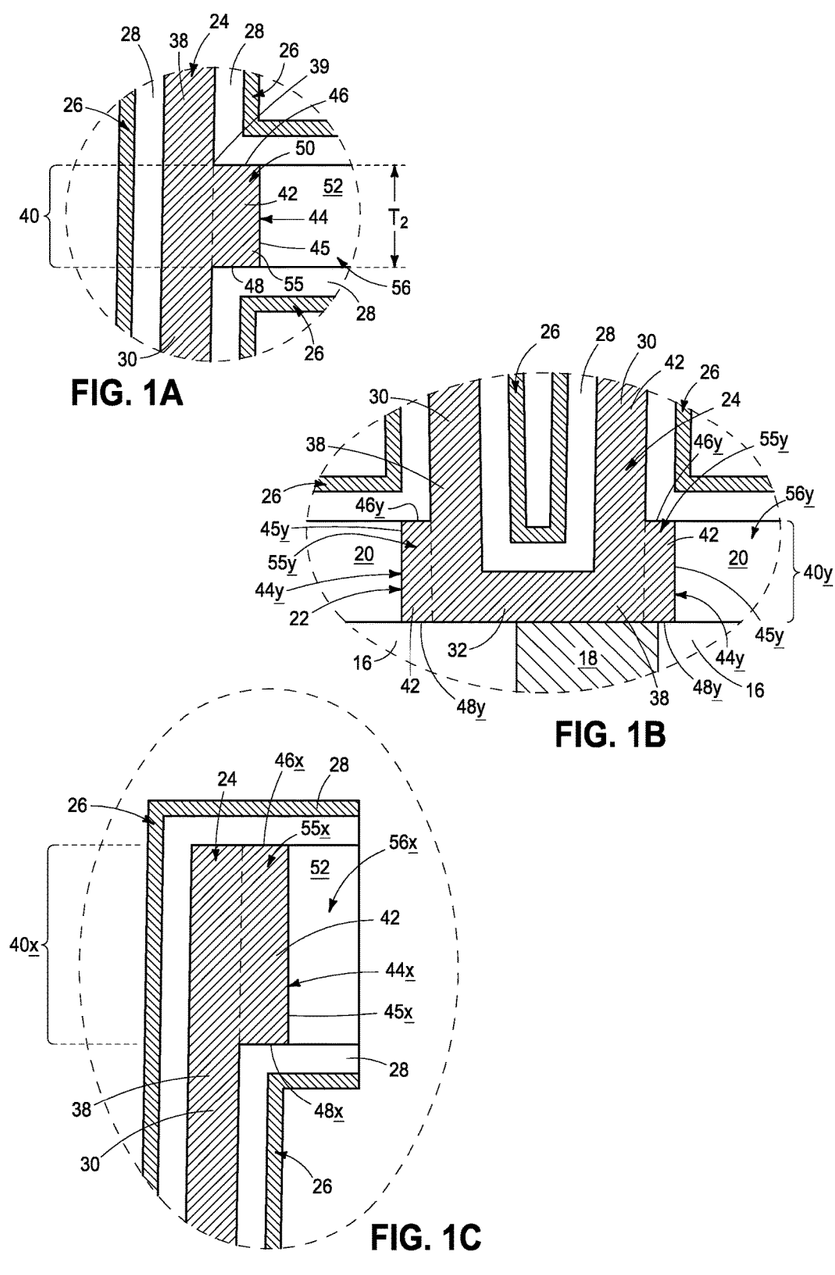
FIG. 1A is an enlargement of the FIG. 1A circled portion in FIG. 1.
FIG. 1B is an enlargement of the FIG. 1B circled portion in FIG. 1.
FIG. 1C is an enlargement of the FIG. 1C circled portion in FIG. 1.

Referring to FIGS. 1 and 1A, and in one embodiment, first electrode 24 comprises elevationally-extending first conductive material 38 having an example elevationally-extending part 40 thereof. First electrode 24 also has a second conductive material 42 that projects laterally outward from elevationally-extending part 40 of first conductive material 38. Laterally-projecting second conductive material 42 has a vertical thickness $T_2$ that is less than that of elevationally-extending first conductive material 38 ($T_1$ in FIG. 1). In one embodiment, second conductive material 42 laterally projects or laterally extends exactly horizontally. Regardless, an example horizontal projecting distance from a most-proximate radially-outermost surface (e.g., surface 39 in FIG. 1A) of first conductive material 38 is 10 to 100 Angstroms.

Figure 2:
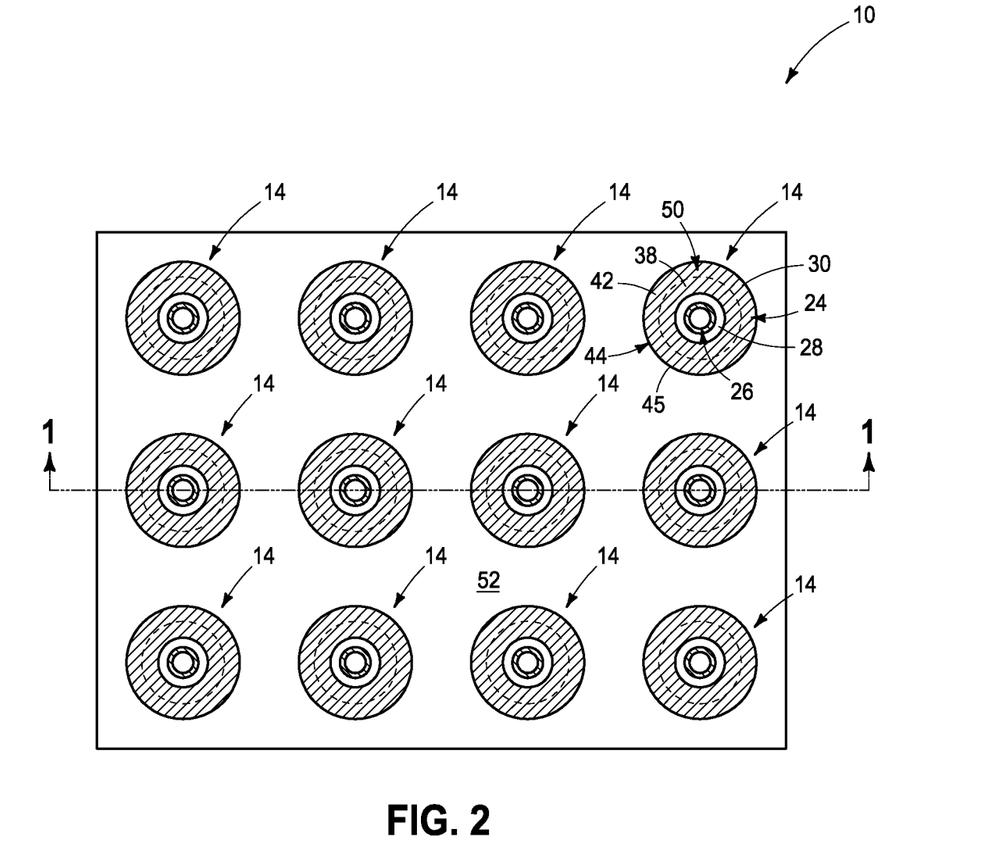
FIG. 2 is a cross-sectional view taken through line 2-2 in FIG. 1.

First conductive material 38 and second conductive material 42 may be of the same composition relative one another (as shown) or may be of different compositions relative one another (not shown in FIGS. 1, 1A, and 2). Regardless, laterally-projecting second conductive material 42 has a tip end 44 which in one embodiment comprises a vertically-extending surface 45. In one embodiment, laterally-projecting second conductive material 42 comprises an upper surface 46 and a lower surface 48 that extend horizontally. In one embodiment, laterally-projecting second conductive material 42 comprises a laterally-projecting ring 50 (FIGS. 1A and 2) that completely encircles elevationally-extending part 40 of first conductive material 38.

Support material 52 laterally supports individual capacitors 14 and contacts tip end 44 (i.e., is directly there-against) of laterally-projecting second conductive material 42. Support material 52 is ideally non-conductive where such supports multiple capacitors to preclude shorting the first electrodes of different capacitors together. Ideal support materials are dielectric, for example silicon dioxide, silicon nitride, and/or silicon oxynitride. In one embodiment and as shown, second conductive material 42 and support material 52 have the same vertical thickness, with an example such thickness being 50 to 200 Angstroms.

In one embodiment and as shown, laterally-projecting second conductive material 42 and support material 52 are located at an elevational mid-portion of first electrode 24, and in one example embodiment may be precisely elevationally centered relative to thickness $T_1$. Alternately, the laterally-projecting second conductive material may be located at a top of the first electrode or at the bottom of the bottom first electrode. In the depicted example embodiments, multi-level elevationally-spaced support materials are shown. However, only a single level of support material as referred to above may be used whether at an elevational mid-portion of the first electrode, the top of the first electrode, at the bottom of the first electrode, or elsewhere. Further, while the example embodiments show three levels of support material (e.g., where material 20 is also considered as a support material) as further described below, two or more than three levels of support material may be used that are directly against first electrode 24.

As an example, laterally-projecting second conductive material 42 may be considered as comprising a first lateral projection 55, elevationally-extending part 40 of first conductive material 38 may be considered as comprising a first elevational part 40, and contacting support material 52 may be considered as comprising a first level 56 of support material 52. Referring to FIGS. 1 and 1C, first electrode 24 comprises a second lateral projection 55x comprising second conductive material 42 that projects laterally outward from a second elevationally-extending part 40x of first conductive material 38, with second elevationally-extending part 40x being different (i.e., not the same elevational part of first conductive material 38) and vertically spaced from first elevational part 40. A second level 56x of support material 52 is vertically spaced from first level 56 of support material 52 and laterally supports the capacitor. Second level 56x of the support material 52 contacts a tip end 44x of second conductive material 42 of second lateral projection 55x. Such may comprise surfaces 45x, 46x, and 48x analogous to surfaces 45, 46, 48, respectively, of first lateral projection 55. Use of first and second with respect to the lateral projections and levels herein is merely for convenience in distinguishing the different lateral projections and levels relative one another, and may be reversed. Regardless and in one embodiment as shown and described immediately above, one of the first and second lateral projections, its associated elevational part of first conductive material 38, and its associated level of support material (i.e., considered collectively) is located at an elevational mid-portion of the first electrode and the other of such is located at the top of first electrode 24. Regardless and in one embodiment as shown, second lateral projection 55x is vertically thicker than first lateral projection 55.

Referring to FIGS. 1 and 1B, a bottom of first electrode 24 may be considered as comprising a third lateral projection 55y comprising second conductive material 42 that projects laterally outward from a third elevational part 40y of first conductive material 38, and that is different and vertically spaced from first elevational part 40. Material 20 may be considered as a third level 56y of support material that is vertically spaced from first level 56 of support material 52 and which also laterally supports the capacitor. Third level 56y of support material 20 contacts a tip end 44y of second conductive material 42 of third lateral projection 55y. Third lateral projection 55y may be of the same or different thicknesses relative to first lateral projection 55 and/or second lateral projection 55x. Third lateral projection 55y may comprise surfaces 45y, 46y, and 48y analogous to surfaces 45, 46, 48, respectively, of first lateral projection 55.

Third lateral projection 55y and/or second lateral projection 55x may comprise a laterally-projecting ring (e.g., analogous to ring 50 of first lateral projection 55) that completely encircles elevationally-extending part 40y and/or 40x, respectively, of first conductive material 38.

First capacitor electrodes 24 extend to conductive vias 18 through vertically-aligned openings formed through support materials 52 and 20. Support material 20 and support material 52 may be of the same composition or of one or more different compositions relative one another. With respect to multiple capacitors, one or more of support materials 52 and 20 may be in the form of a plate that contacts and laterally supports the respective first capacitor electrodes 24, for example as shown with respect to each. Capacitor insulator 28 may extend over all surfaces of support materials 52 and 20 where they do not contact first electrodes 24, for example as shown. Further in a finished circuit construction, insulative material would likely fill all the depicted void space further supporting the capacitors.

Figures 3, 3A:
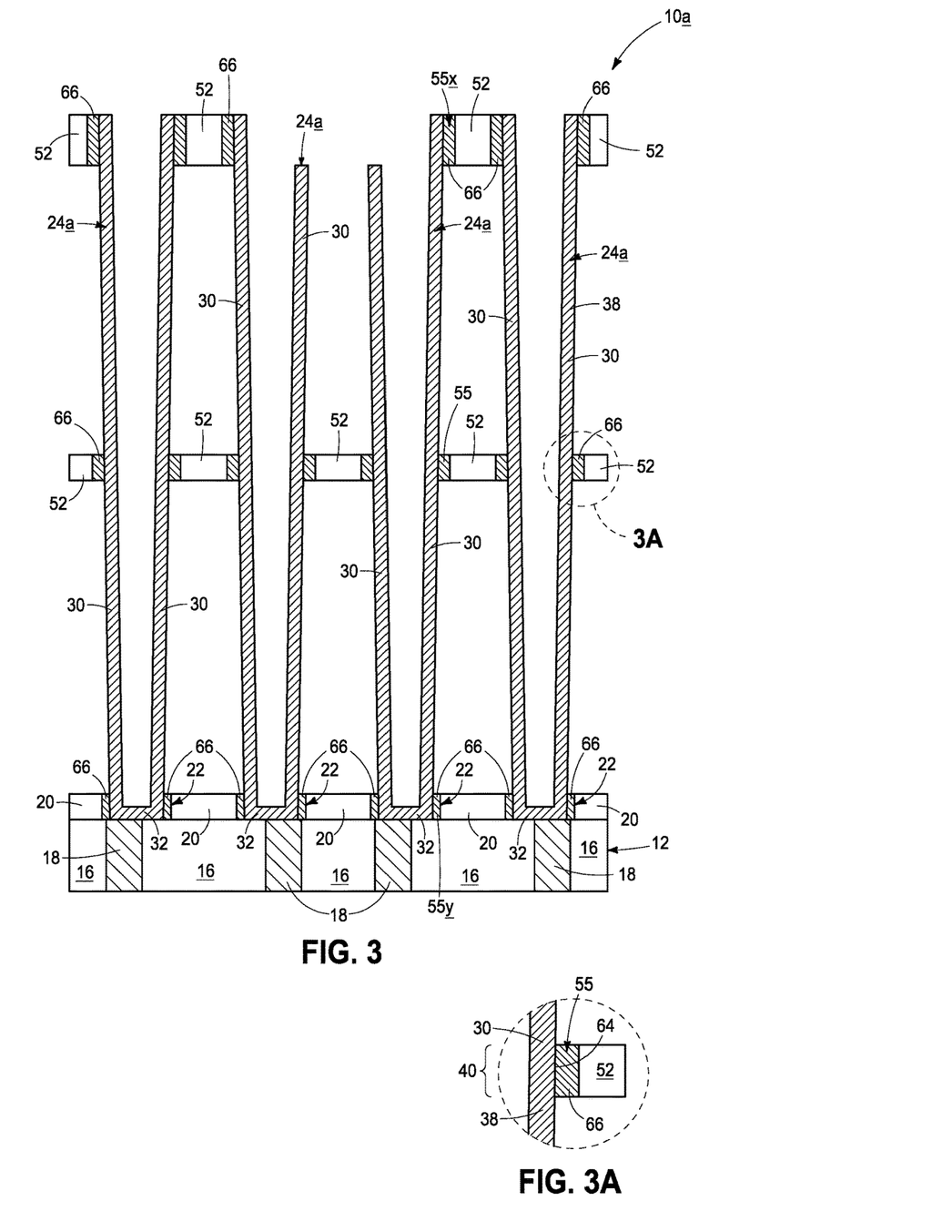
FIG. 3 is a diagrammatic cross-sectional view of a predecessor construction in process to produce a device in accordance with an embodiment of the invention.
FIG. 3A is an enlargement of the FIG. 3A circled portion in FIG. 3.

An alternate embodiment construction 10a in comparison to that of FIGS. 1, 1A-C, and 2 is described with reference to FIGS. 3 and 3A. Like numerals from the above-described embodiments have been used where appropriate, with some construction differences being indicated with the suffix "a" or with different numerals. FIG. 3 corresponds to the depiction of FIG. 1, yet does not show the capacitor insulator material nor the second electrode of individual capacitors for clarity in FIG. 3. First electrode 24a comprises elevationally-extending first conductive material 38 that may be considered as comprising a laterally-outer sidewall surface 64 thereof (FIG. 3A). Second material 66 contacts an elevationally-extending part 40 of first conductive material laterally-outer sidewall surface 64, with second material 66 projecting laterally-outward from elevationally-extending part 40 of first material laterally-outer sidewall surface 64. Second material 66 is of different composition from that of first conductive material 38 and is at least one of conductive or semiconductive. Where conductive, the embodiment depicted in FIG. 3 may have any of the attributes described above with respect to the first embodiment. Even where semiconductive, the embodiment of FIG. 3 may also have any of the attributes as described above with respect to the FIGS. 1, 1A-C, and 2 embodiment but for second material 66 being semiconductive. Support material 52 laterally supports the resulting capacitor, with the support material contacting a tip end 44 of laterally-projecting second material 66.

Further for example and as shown, three levels of support material and first, second, and third lateral projections 55, 55x, and 55y, respectively, may be used. Some or all of lateral projections 55, 55x, and 55y may be of the same composition or of different compositions relative one another, and each need not comprise a different composition second material 66 relative to first material 38 as long at least one does, in one embodiment. Any other attribute(s) or aspect(s) as described above and/or shown in the figures pertaining thereto may be used.

Figure 4:
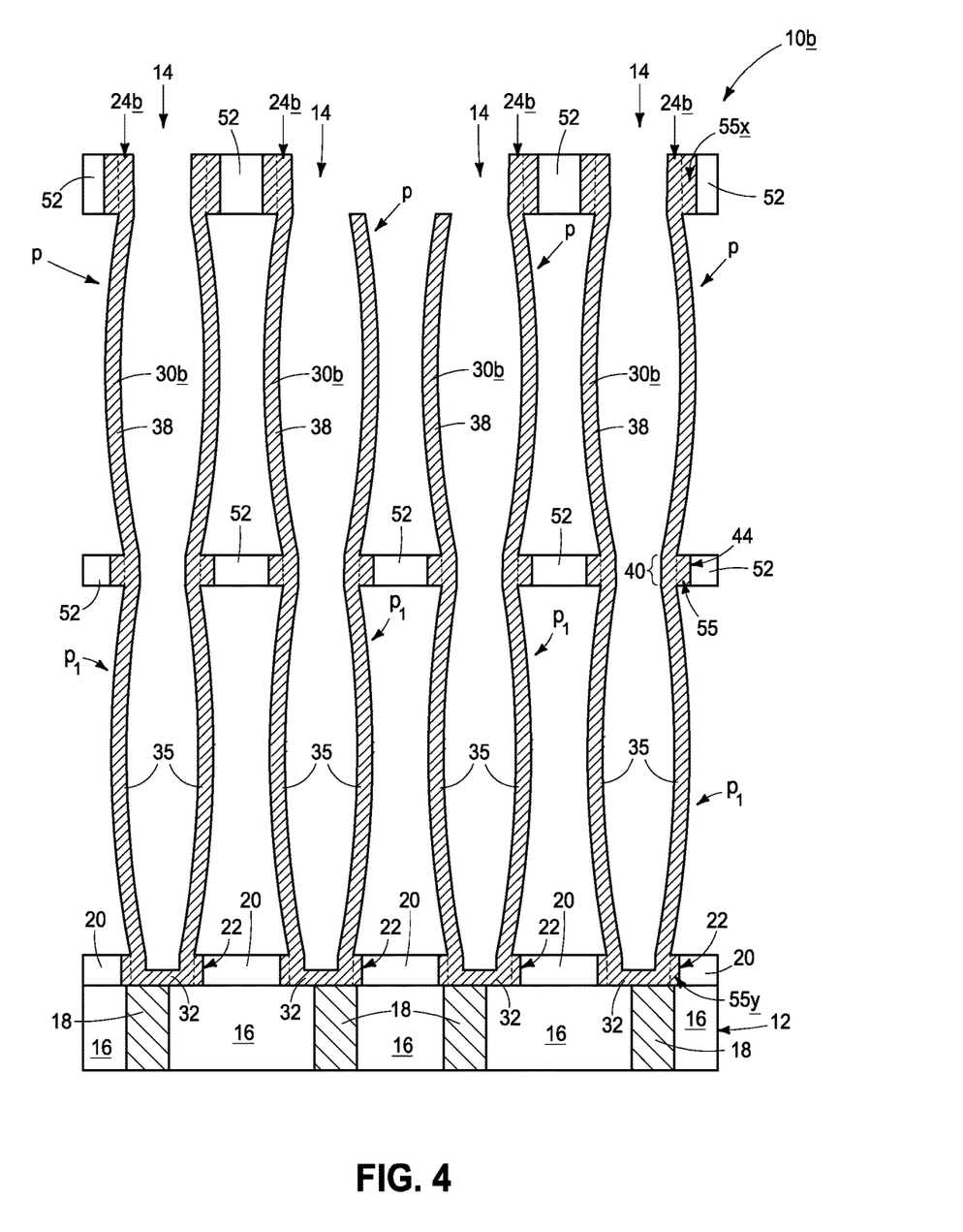
FIG. 4 is a diagrammatic cross-sectional view of a predecessor construction in process to produce a device in accordance with an embodiment of the invention.

An alternate embodiment construction 10b is next described with reference to FIG. 4. Like numerals from the above-described embodiments have been used where appropriate, with some construction differences being indicated with the suffix "b" or with different numerals. Again, FIG. 4 is analogous to FIG. 1 yet does not show the capacitor insulator material nor the second electrode for clarity in FIG. 4. First electrode 24b is shown as being essentially the same as that in FIG. 1 except wherein it has opposing sidewalls 30b that bow radially-outward in at least one vertical cross-section (e.g., the vertical cross-section of the construction as shown in FIG. 4). Lateral projections 55, 55x, 55y relative to bowing sidewalls 30b are shown as being of the same composition as that of first conductive material 38, although such could be of a different conductive composition or of a semiconductive composition for example as described above in connection with FIGS. 3 and 3A. However and regardless, in one embodiment first electrode 24b is elongated, extends elevationally, and includes a pair P of radially opposing sidewalls 30b that bow radially-outward in at least one vertical cross-section.

First electrode 24b comprises elevationally-extending conductive material 38 with a portion 55 thereof projecting laterally outward from an elevationally-extending part 40 of conductive material 38 in the at least one vertical cross-section. Support material 52 laterally supports the capacitor, and contacts a tip end 44 of laterally-projecting portion 55 of conductive material 38. In one embodiment and as shown, opposing sidewalls 30b bow radially-outward in the vertical cross-section a greater distance than does laterally-projecting portion 55 of conductive material 38 from its elevationally-extending part/portion 40 conductive material 38 in the vertical cross-section. In one embodiment and as shown, the laterally-projecting portion of the conductive material and the support material are located at an elevational mid-portion of the first electrode.

Pairs P of opposed radially-bowing sidewalls may be considered as being above laterally-projecting portions 55, with, in one embodiment, the construction further comprising other pairs $P_1$ of radially-opposing sidewalls 35 that bow radially-outward in the vertical cross-section below laterally-projecting portion 55. Any other attribute(s) or aspect(s) as described above and/or shown in the figures pertaining thereto may be used. Prior art constructions exist having outwardly-bowing sidewalls, but not with laterally-projecting portions 55.

Figure 5:
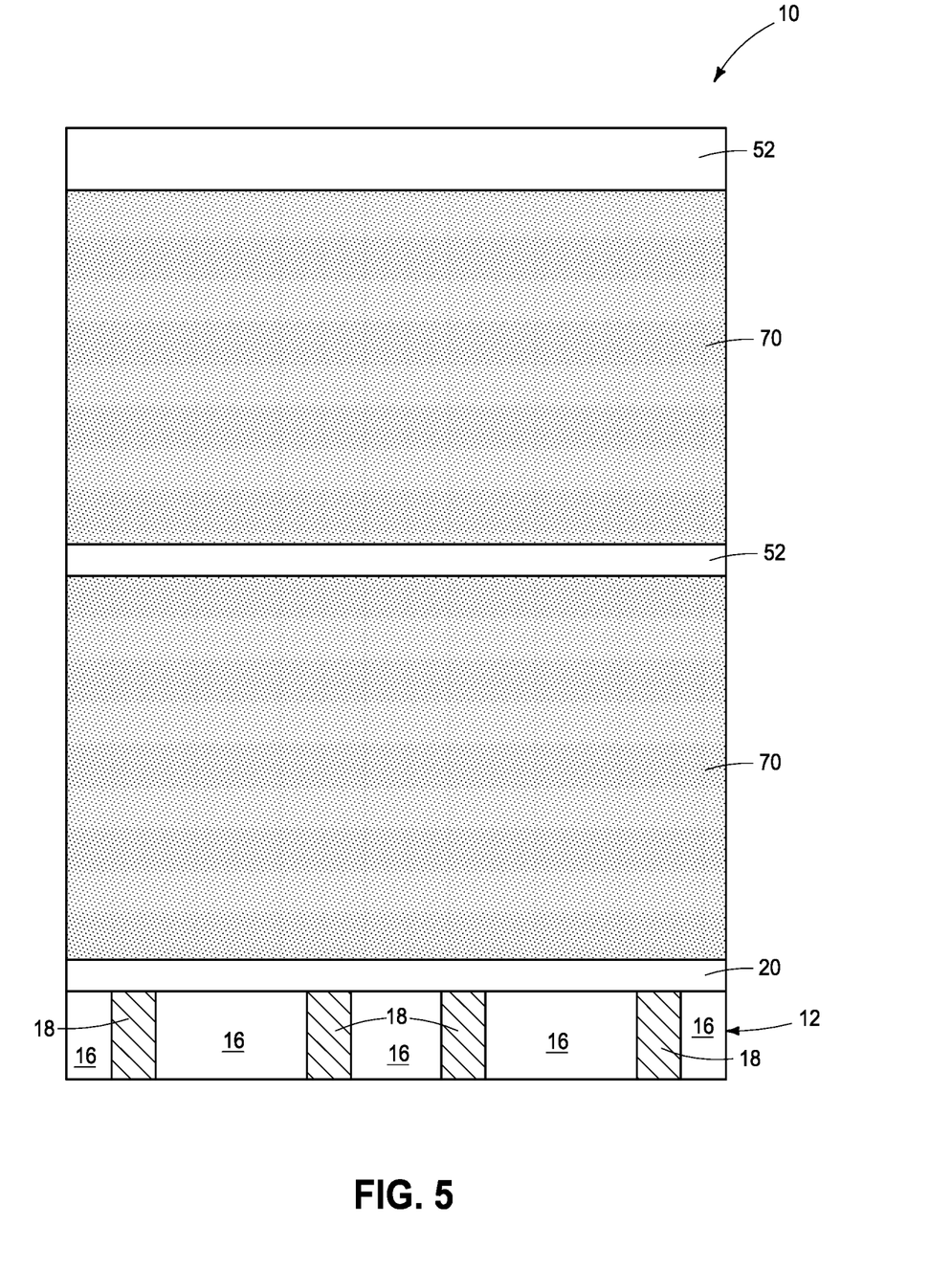
FIG. 5 is a diagrammatic cross-sectional view of a predecessor construction to the device of FIG. 1.

Devices in accordance with the invention may be manufactured in accordance with any existing or yet-to-be-developed techniques. Example techniques are next described with reference to FIGS. 5-10. Like numerals from the above-described embodiments have been used where appropriate for predecessor constructions and materials. FIG. 5 shows construction 10 having etch stop/support material 20 and support materials 52 fabricated there-over. Sacrificial material 70 is between support material 20 and mid-support material 52 and sacrificial material 70 is between upper-support material 52 and mid-support material 52. Such regions of sacrificial material 70 may be of the same composition or of different compositions relative one another, with an example being boron and/or phosphorus doped silicate glass or silicon dioxide. Material 70 may be subjected to thermal treatment (e.g., nitrogen annealing for densification).

Figure 6:
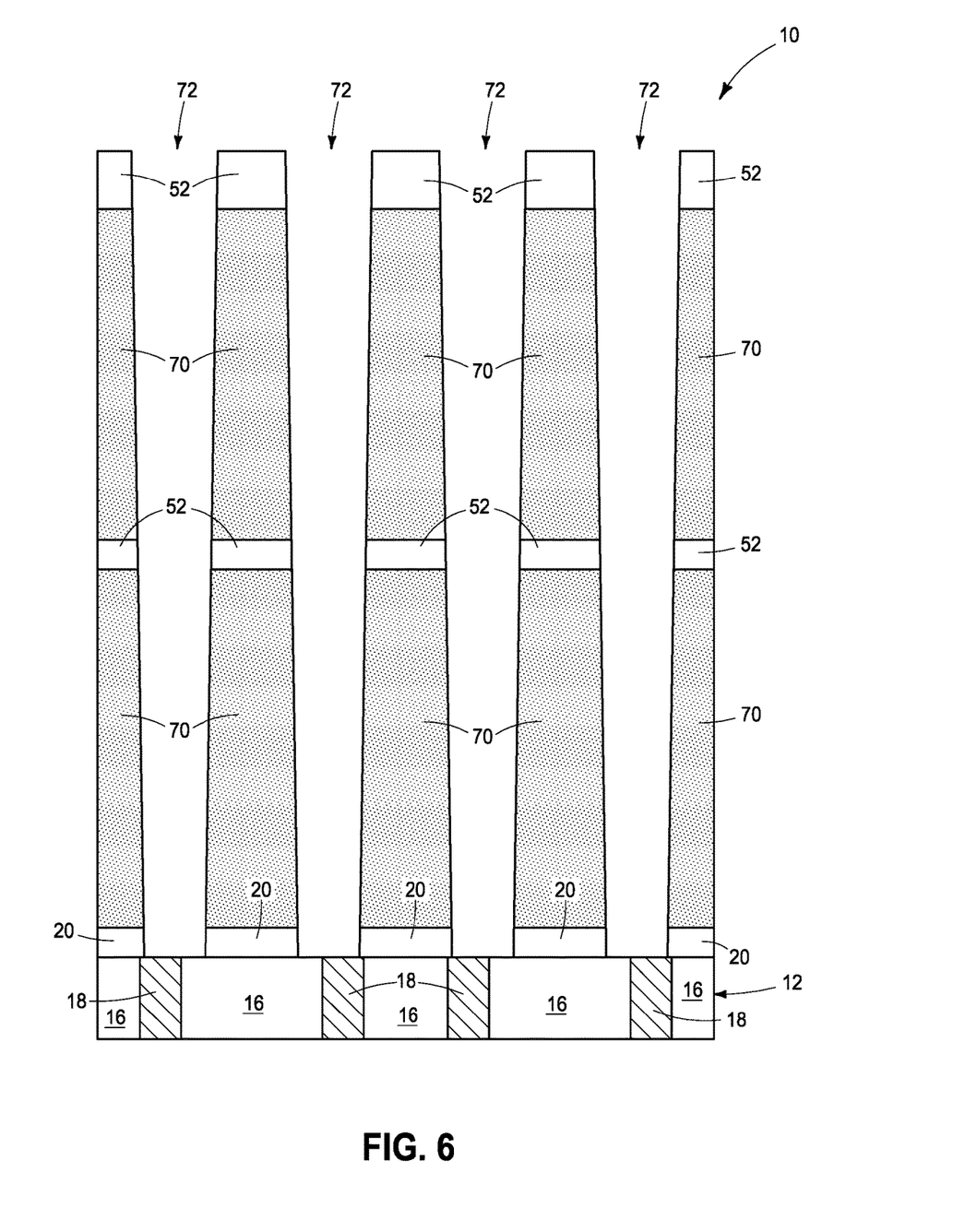
FIG. 6 is a view of the FIG. 5 construction at a processing step subsequent to that shown by FIG. 5.

Referring to FIG. 6, openings 72 within which capacitor electrodes will be formed have been formed through materials 52, 70, and 20 to expose conductive vias 18. An example maximum diameter of elevationally-outermost portions of openings 72 is 200 to 600 Angstroms. An example technique for forming the construction of FIG. 6 includes photolithographic patterning and etch, with or without using pitch multiplication.

Figure 7:
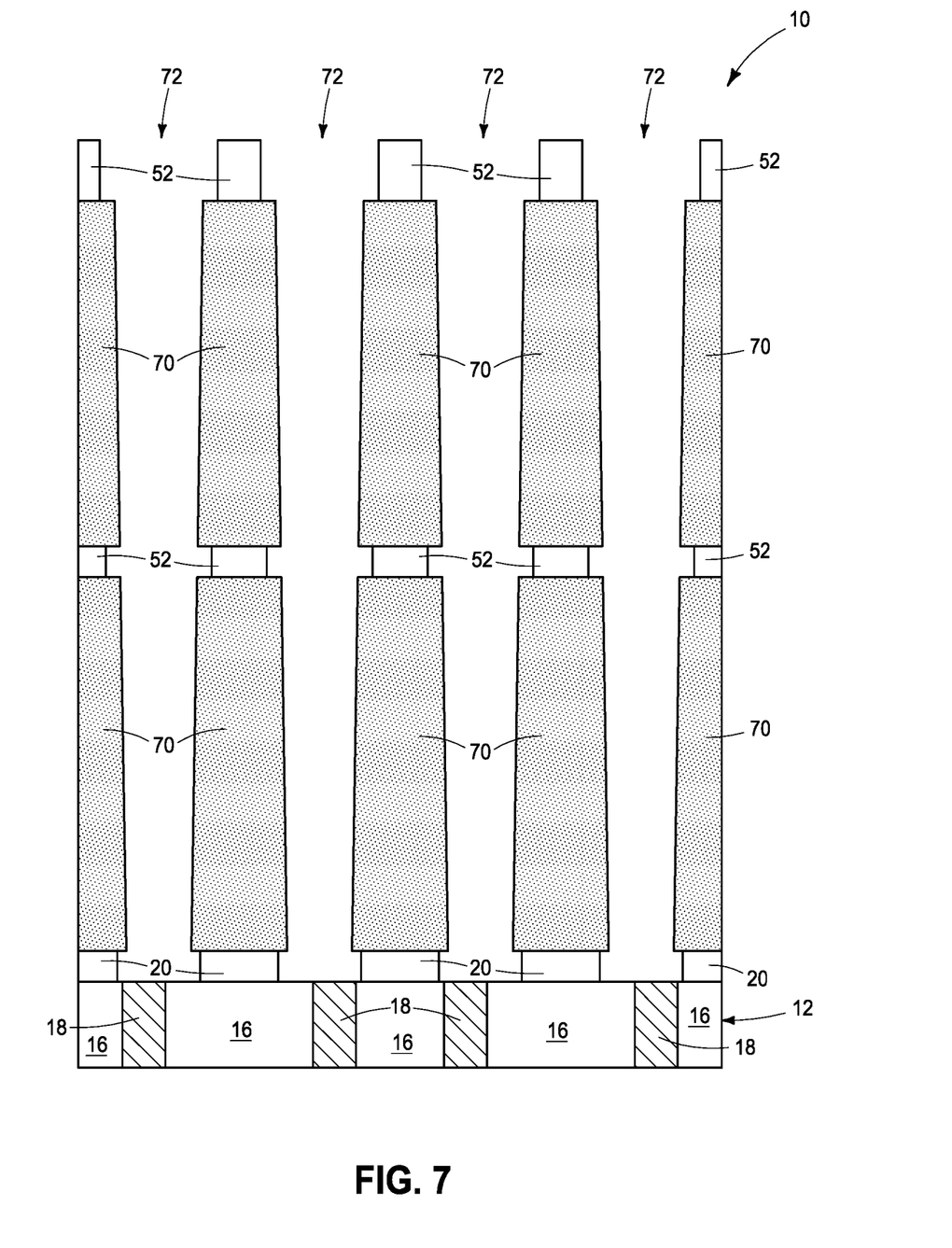
FIG. 7 is a view of the FIG. 6 construction at a processing step subsequent to that shown by FIG. 6.

Referring to FIG. 7, support materials 20 and 52 have been subjected to suitable etching such that they are laterally recessed relative to the sidewalls of openings 72 as originally shown in FIG. 6. The depicted lateral recesses may be formed using any suitable dry and/or wet etchant(s) that etches materials 20 and 52 selectively relative to sacrificial material 70.

Figure 8:
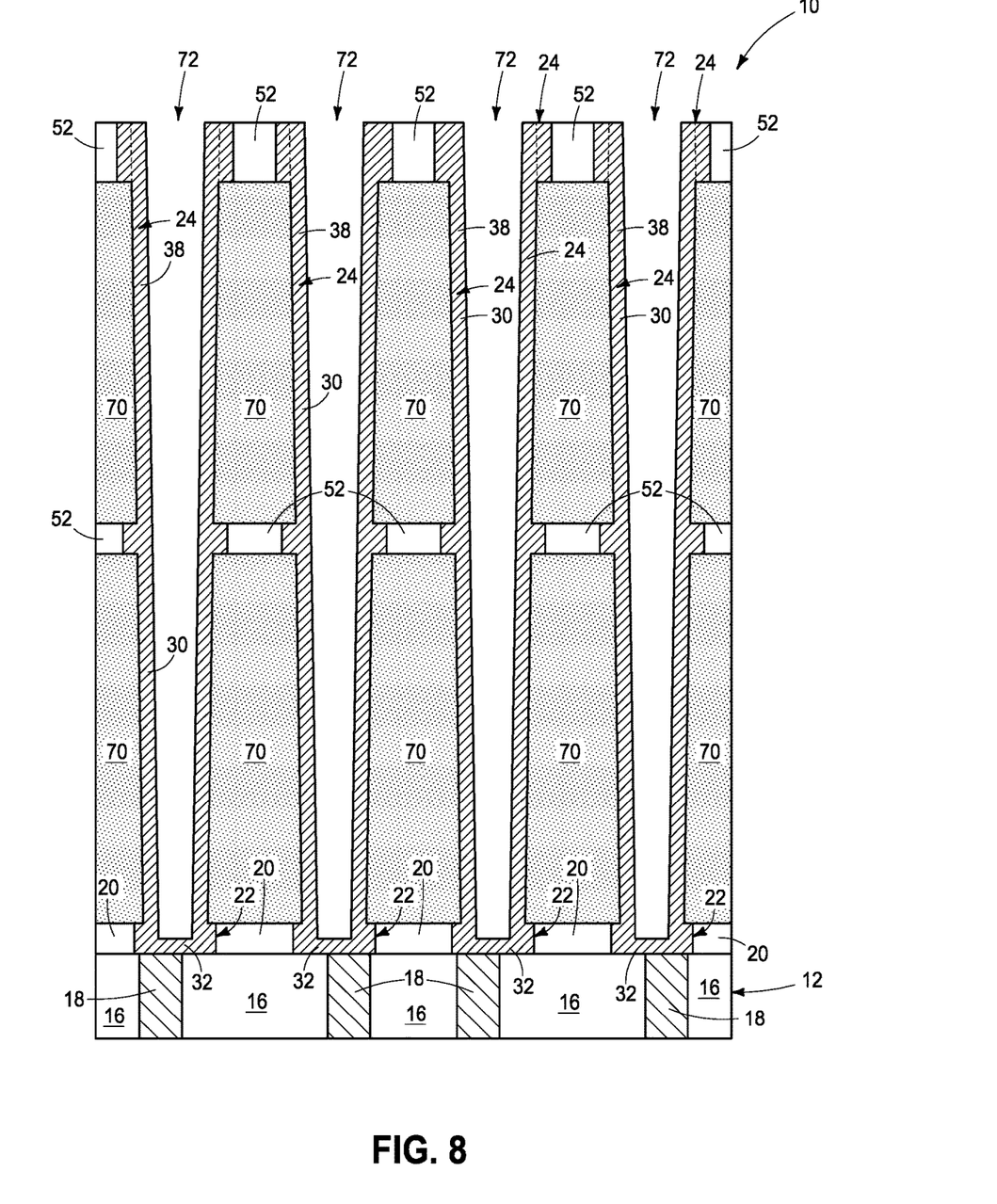
FIG. 8 is a view of the FIG. 7 construction at a processing step subsequent to that shown by FIG. 7.

Referring to FIG. 8, first conductive material 38 has been deposited into openings 72 so as to fill the depicted lateral recesses, followed by removing material 38 from being received over horizontal surfaces of upper support material 52. First conductive material 38 may not necessarily completely fill the recesses whereby such forms a lining that less-than-fills such recesses. Accordingly, in method and structure embodiments, the second conductive material and lateral projection formed thereby may be of a right-facing and left-facing C-shape (not shown) in vertical cross-section.

Figure 9:
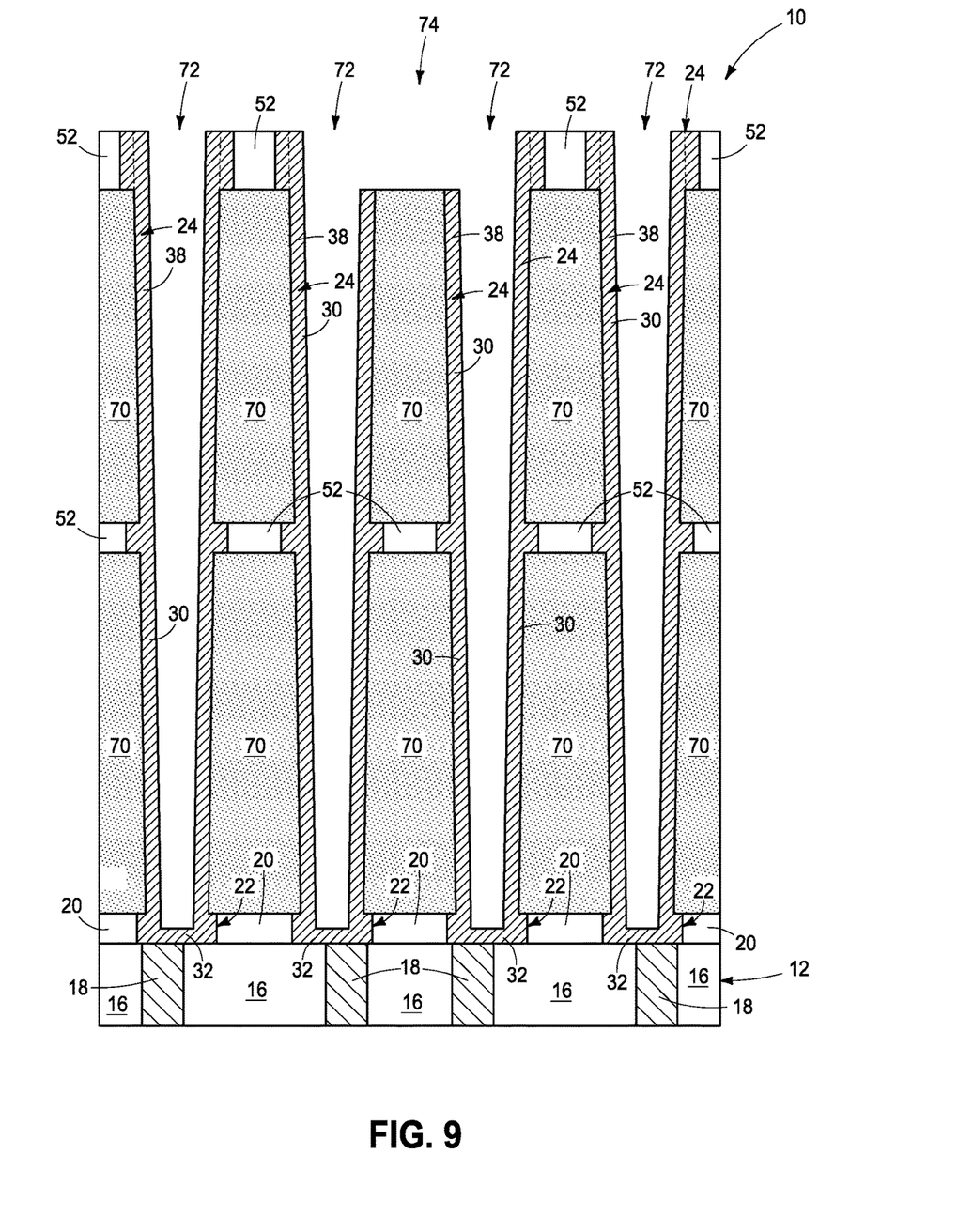
FIG. 9 is a view of the FIG. 8 construction at a processing step subsequent to that shown by FIG. 8.

Referring to FIG. 9, portions of upper support material 52 and first conductive material 38 have been removed to form openings 74 (only one being shown) which extend to upper sacrificial material 70. Openings 74 provide access for wet etching chemicals to reach and remove sacrificial material 70, and for access to first conductive material 38 for formation of capacitor insulator material and second electrode material there-over. Formation of openings 74 may be conducted by suitable photolithographic patterning and etch of materials 38 and 70 using one or more etching steps.

Figure 10:
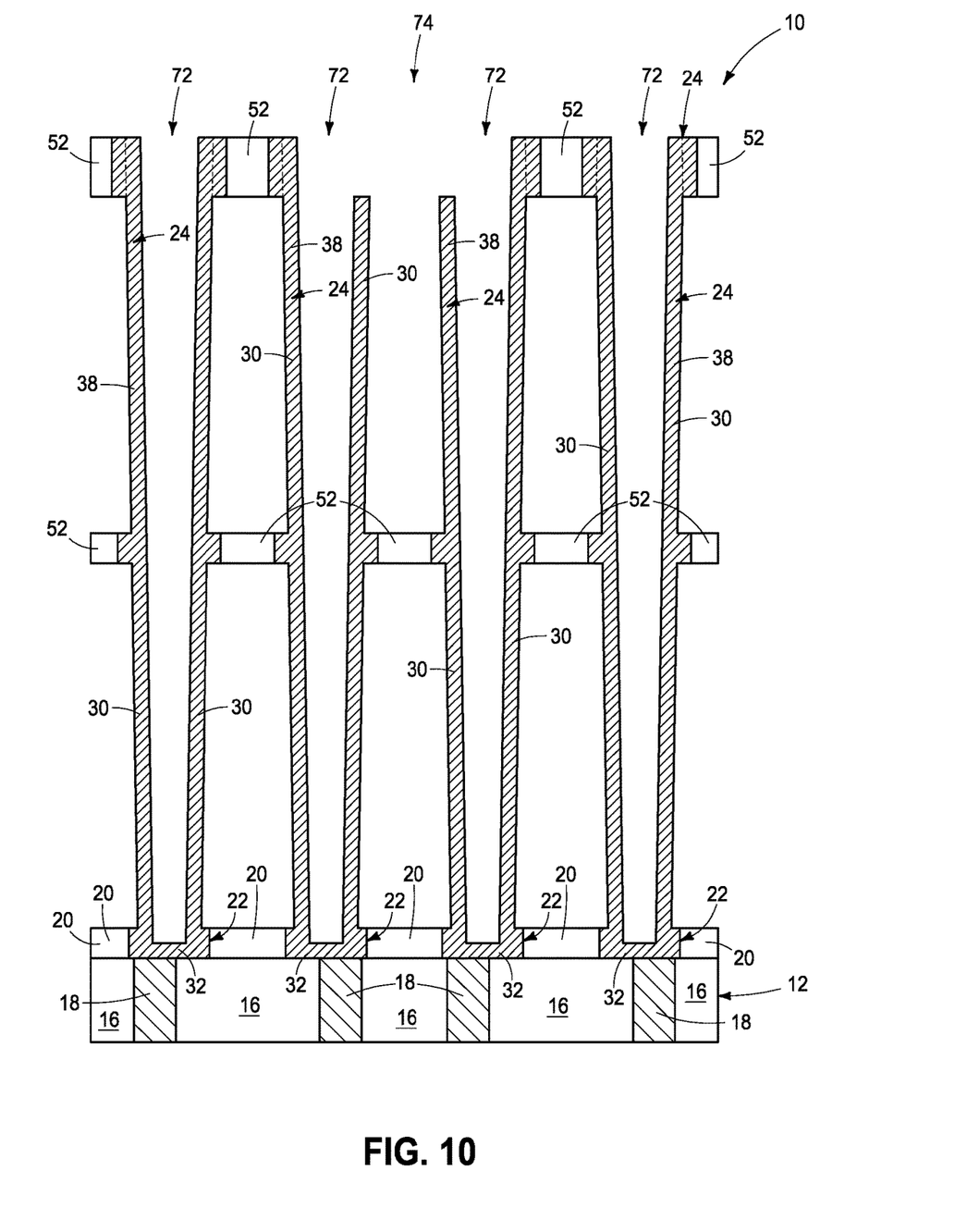
FIG. 10 is a view of the FIG. 9 construction at a processing step subsequent to that shown by FIG. 9.

Referring to FIG. 10 the depicted upper and lower sacrificial materials 70 (not shown) have been removed, for example by selective wet etching using HF where material 70 predominantly comprise silicon dioxide. Subsequent processing (not shown) would occur that includes deposition of capacitor insulator 28 and conductive material for second electrodes 26 to produce, for example, a construction like that shown in FIGS. 1, 1A-1C, and 2.

For producing the example embodiment of FIG. 3, second material 66 (not shown) could be deposited to initially line openings 72 and fill or line the lateral recesses. This could be followed by an anisotropic etch to leave the second material only within the recesses. Thereafter, conductive material 38 could be deposited analogously as shown in FIG. 8, followed by subsequent processing.

For fabrication of a capacitor in accordance with the example FIG. 4 embodiment and as described, etching conditions for forming openings 72 may be modified as determinable by persons of skill in the art to inherently cause a lateral-outward bowing effect of sacrificial material 70 upon formation of openings 72, followed by deposition of conductive material 38 (or second material 66, then material 38). Alternately, the construction of FIG. 6 could be subjected to one or more suitable isotropic and/or anisotropic etching chemistries to cause a bowing effect to sacrificial material 70 after openings 72 are initially formed.

CONCLUSION

In some embodiments, a device comprises a capacitor comprising first and second electrodes having a capacitor insulator there-between. The first electrode is elongated and extends elevationally. The first electrode comprises elevationally-extending first conductive material and comprises second conductive material that projects laterally outward from an elevationally-extending part of the first conductive material. The laterally-projecting second conductive material has a vertical thickness that is less than that of the elevationally-extending first conductive material. Support material laterally supports the capacitor and contacts a tip end of the laterally-projecting second conductive material.

In some embodiments, a device comprises a capacitor comprising first and second electrodes having a capacitor insulator there-between. The first electrode is elongated and extends elevationally. The first electrode comprises elevationally-extending first conductive material comprising a laterally-outer sidewall surface. Second material contacts an elevationally-extending part of the first conductive material laterally-outer sidewall surface and projects laterally outward from the elevationally-extending part of the first material laterally-outer sidewall surface. The second material is of different composition from that of the first conductive material and is at least one of conductive or semiconductive. Support material laterally supports the capacitor and contacts a tip end of the laterally-projecting second material.

In some embodiments, a device comprises a capacitor comprising first and second electrodes having a capacitor insulator there-between. The first electrode is elongated, extends elevationally, and includes a pair of radially opposing sidewalls that bow radially-outward in at least one vertical cross-section. The first electrode comprises elevationally-extending conductive material. A portion of the conductive material projects laterally outward from an elevationally-extending part of the conductive material in the at least one vertical cross-section. Support material laterally supports the capacitor and contacts a tip end of the laterally-projecting portion of the conductive material.

In some embodiments, a device comprises a capacitor comprising a first electrode and support material supporting the capacitor. The first electrode comprises first conductive material extending vertically and second conductive material projecting horizontally from a part of the first conductive material. The support material supports the capacitor in contact with a tip end of the second conductive material.

In compliance with the statute, the subject matter disclosed herein has been described in language more or less specific as to structural and methodical features. It is to be understood, however, that the claims are not limited to the specific features shown and described, since the means herein disclosed comprise example embodiments. The claims are thus to be afforded full scope as literally worded, and to be appropriately interpreted in accordance with the doctrine of equivalents.

The invention claimed is:

1. A method of forming a plurality of capacitors individually comprising first and second electrodes having a capacitor insulator there-between, comprising:
   forming openings in support material and sacrificial material;
   laterally recessing the support material relative to the sacrificial material within the openings to form lateral recesses;
   forming conductive material within the openings and within the lateral recesses and forming first capacitor electrodes therefrom;
   after forming the conductive material, removing the sacrificial material;
   forming a capacitor insulator over the first capacitor electrodes; and
   forming conductor material over the capacitor insulator and forming second capacitor electrodes therefrom, the second electrodes being vertically directly above and vertically directly below the conductive material in the lateral recesses and being vertically directly above and vertically directly below the support material.

2. The method of claim 1 wherein the conductive material is homogenous.

3. The method of claim 1 wherein the conductive material is not homogenous.

4. The method of claim 3 wherein a first-deposited composition of the conductive material comprises a second conductive material and a second-deposited composition of the conductive material comprises a first conductive material that is of different composition from that of the second conductive material, the second conductive material being in the lateral recesses, the first conductive material not being in the lateral recesses.

5. The method of claim 1 comprising forming an upper layer of support material and etching access openings therethrough after forming the conductive material to expose an upper surface of the sacrificial material, the removing comprising etching the sacrificial material through the access openings.

6. The method of claim 1 wherein the conductive material and the conductor material are of the same composition relative one another.

7. The method of claim 1 wherein the conductive material and the conductor material are of different compositions relative one another.

8. The method of claim 1 wherein the conductive material completely fills the laterally recesses.

9. The method of claim 1 wherein the support material is directly against tip ends of the conductive material that is in the lateral recesses.

10. The method of claim 1 wherein the first conductive electrodes are formed in a cup shape to define a radially inner space and a radially outer space.

11. The method of claim 1 wherein the first conductive electrodes are not formed in a cup shape.

12. A method of forming a plurality of capacitors individually comprising first and second electrodes having a capacitor insulator there-between, comprising:
   forming openings in support material and sacrificial material;
   laterally recessing the support material relative to the sacrificial material within the openings to form lateral recesses;
   forming second conductive material within the lateral recesses;
   forming first conductive material within the openings directly against the second conductive material that is within the lateral recesses and forming first capacitor electrodes comprising the first and second conductive materials;
   after forming the first conductive material, removing the sacrificial material;
   forming a capacitor insulator over the first capacitor electrodes; and
   forming conductor material over the capacitor insulator and forming second capacitor electrodes therefrom, the second electrodes being vertically directly above and vertically directly below the second conductive material that is in the lateral recesses and being vertically directly above and vertically directly below the support material.

13. The method of claim 12 wherein the first and second conductive materials are of different compositions relative one another.

14. The method of claim 12 wherein the second conductive material is homogenous and completely fills the lateral recesses.

15. The method of claim 12 wherein the second conductive material does not completely fill the lateral recesses.

16. The method of claim 15 wherein the second conductive material is of C-shape in vertical cross-section in the lateral recesses.

17. The method of claim 16 wherein the first and second conductive materials are of different compositions relative one another.

18. A method of forming a plurality of capacitors individually comprising first and second electrodes having a capacitor insulator there-between, comprising:
   forming openings in support material and sacrificial material, the openings bowing laterally outward;
   laterally recessing the support material relative to the sacrificial material within the openings to form lateral recesses;
   forming conductive material within the openings and within the lateral recesses and forming first capacitor electrodes therefrom that bow laterally outward;
   after forming the conductive material, removing the sacrificial material;
   forming a capacitor insulator over the laterally-outward-bowing first capacitor electrodes; and
   forming conductor material over the capacitor insulator and forming second capacitor electrodes therefrom, the second electrodes being vertically directly above and vertically directly below the conductive material in the lateral recesses and being vertically directly above and vertically directly below the support material.

19. The method of claim 18 wherein the openings are caused to bow laterally outward after forming initial openings in the support material and the sacrificial material.

* * * * *